Dec. 27, 1927.
T. BROWN
DRAFT DEVICE FOR PLOWS
1,653,695
Filed May 7, 1921    3 Sheets-Sheet 1
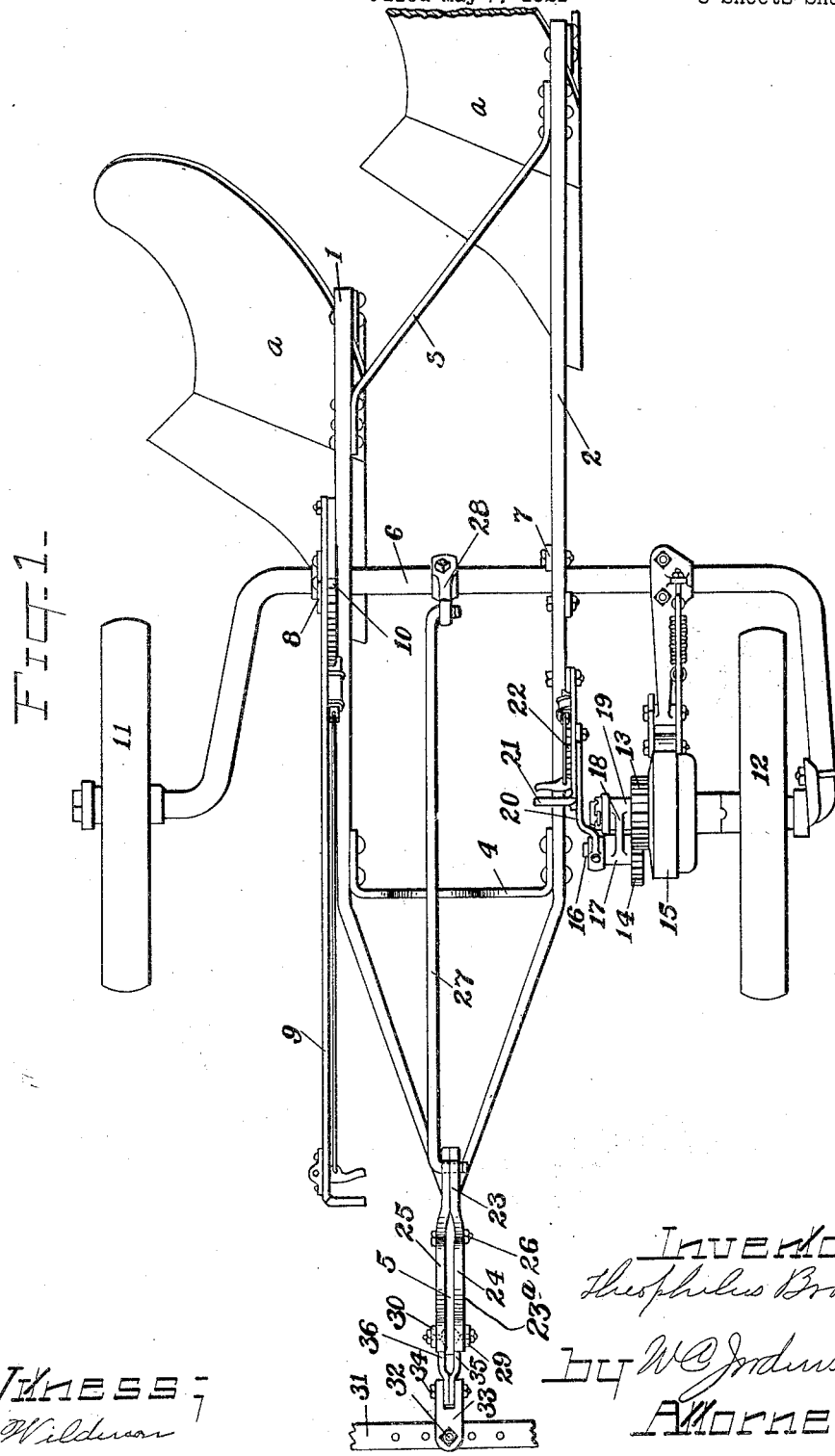

Dec. 27, 1927.
T. BROWN
DRAFT DEVICE FOR PLOWS
Filed May 7, 1921
1,653,695
3 Sheets-Sheet 2
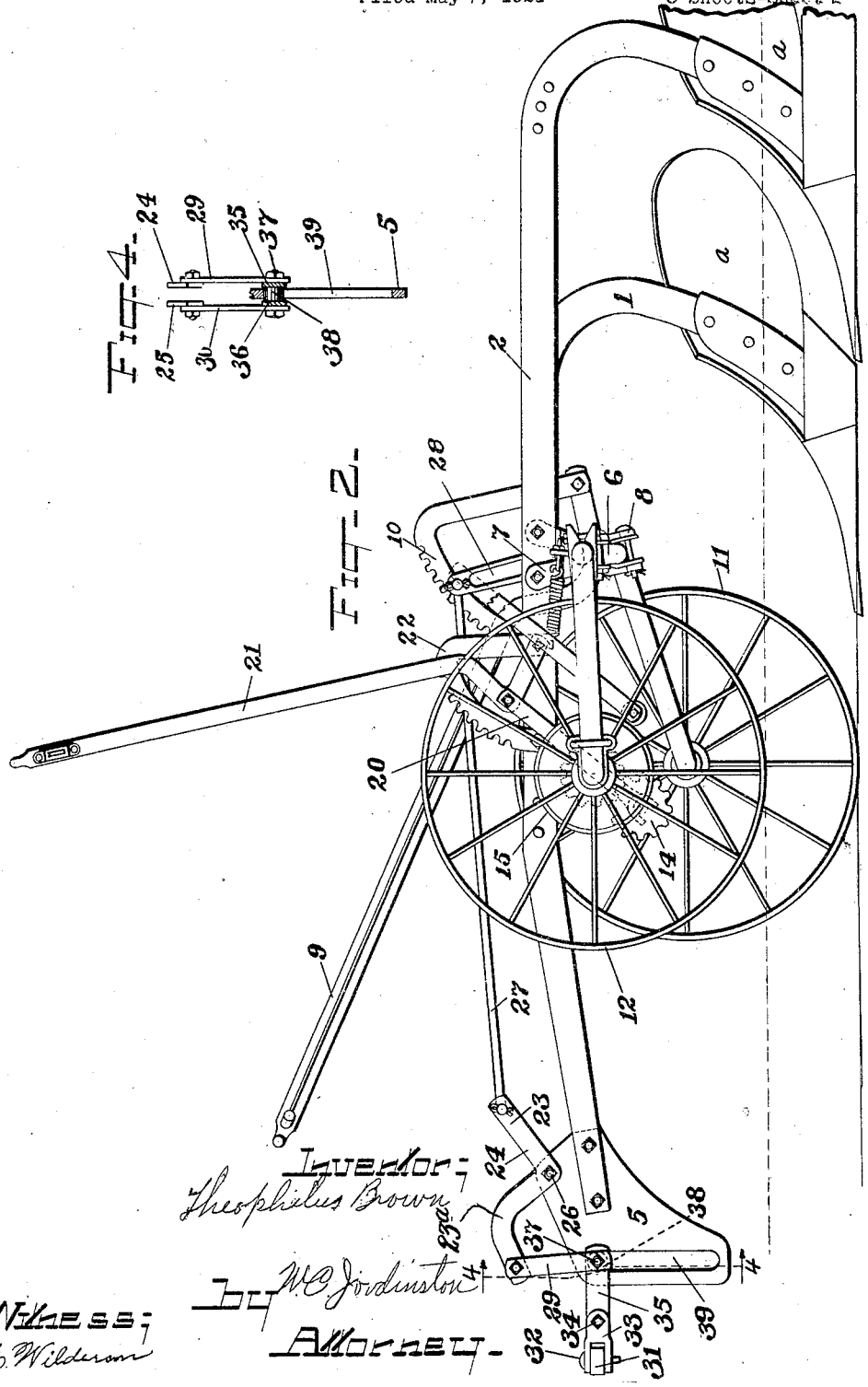

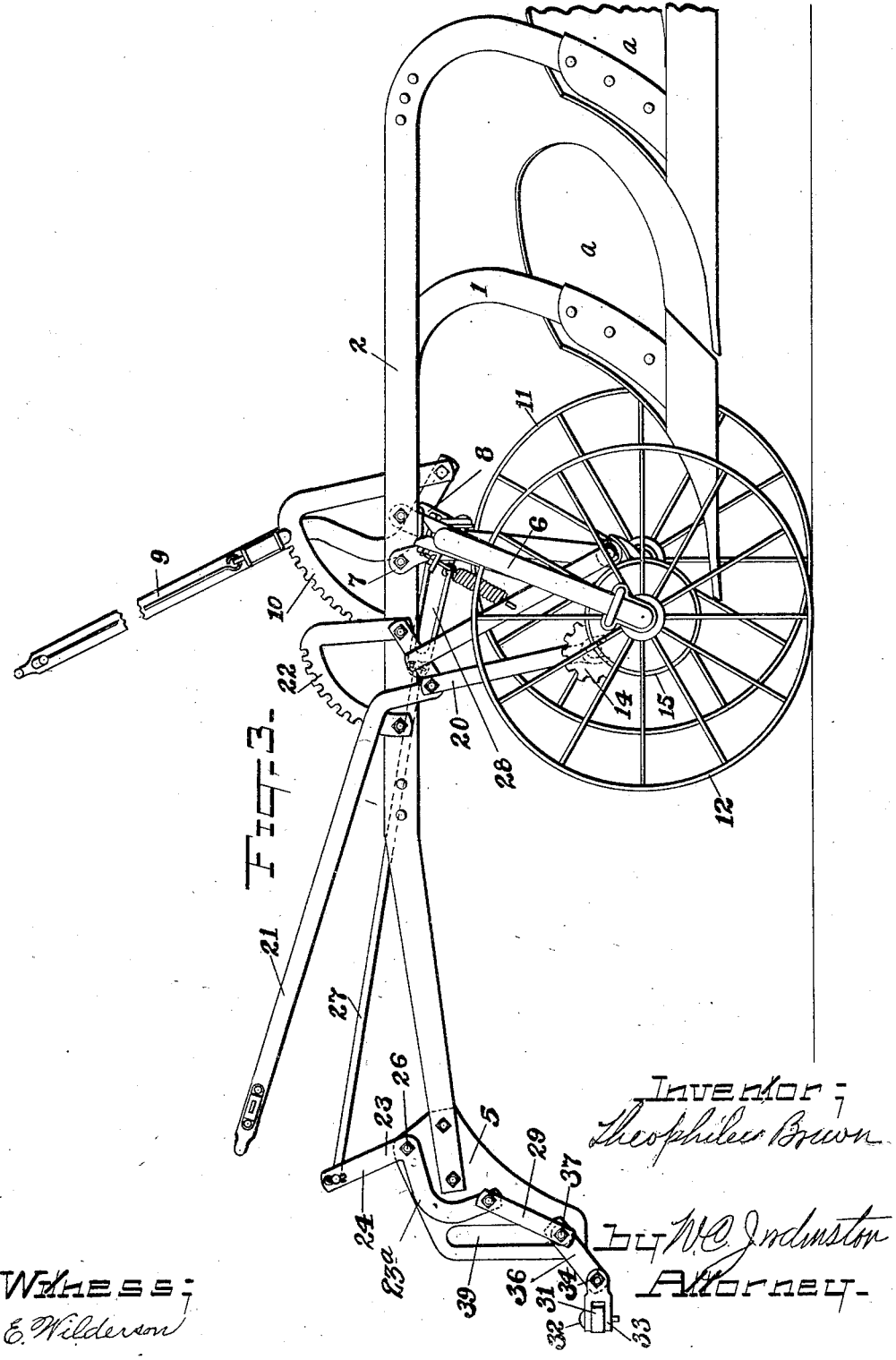

Patented Dec. 27, 1927.

1,653,695

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

DRAFT DEVICE FOR PLOWS.

Application filed May 7, 1921. Serial No. 467,525.

My invention relates to wheeled plows of the power-lift type, that is to say, plows in which provision is made for lifting the plow body or bodies out of operative position by power derived from a ground engaging supporting wheel, the action of the power-lift mechanism being made effective by a clutch or other suitable mechanism the operation of which is optionally controlled by an operator on the tractor by which such plows are usually drawn. Most plows of this type comprise a plow body carrying frame, made up of the plow beams braced together, and one or more supporting crank axles on which land and furrow wheels are respectively mounted, the raising or lowering of the plow bodies being effected by the rocking of such crank axles. In addition to the power-operated mechanism for lifting the plow bodies out of operative position, it is also usual to provide means for adjusting the plow bodies vertically while in the ground to vary the depth of plowing, a common form of such mechanism comprising a lever adapted to be locked in its different positions of adjustment, and operatively connected with the supporting devices for the plow bodies as, for example, one of the crank axles, so that by operating said lever such axle may be rocked to a limited extent, thereby raising or lowering the operative position of the plow bodies with relation to the wheel or wheels to vary the depth of the furrow opened by them.

In plows of this type, it is important that the bottom of the plow bodies run level at the different depths at which they are operated, and in order to obtain this desirable result, it is necessary that the connections between the propelling member, such as a tractor, and the forward end of the beam or frame be such that vertical movement of the front end of the beam in response to adjustment of the plow bodies to vary the plowing depth, will be permitted without, however, deflecting the draft connections out of the line of draft; in other words, that the point of application of the draft to the plow beam or frame will be maintained approximately constant with respect to the ground notwithstanding vertical movement of the front end of the beam incident to change in the depth of plowing.

In the pending application of Carl G. Strandlund and myself, Serial No. 371,245, we have shown and described a plow in which the point of application of the draft to the plow beam is maintained substantially constant relatively to the ground when the plow is at work by means connected with and actuated by the depth adjusting lever, and the object of my present invention is to actuate the devices by which the point of application of the draft to the beam is maintained substantially constant with reference to the ground, by direct action of the crank axle by which the plow bodies are raised or lowered; also in connection therewith to provide a depth adjusting lever by which said axle may be rocked to a limited extent to vary the depth of plowing, and the point of application of the draft to the beam will be maintained at the proper point while the plow bodies are in operative position, and furthermore the operative setting of the draft devices with relation to the plow beam will remain undisturbed by the lifting of the plow bodies out of operative position, so that when they are lowered again into operative position no readjustment of the position of draft devices is required.

Referring to the drawings in which similar numerals indicate identical parts—

Figure 1 is a plan view of a wheeled plow embodying my invention.

Figure 2 is a side elevation showing the plow in operative position.

Figure 3 is a side elevation showing the plow raised, and

Figure 4 is a sectional detail on the line 4—4 of Figure 2.

The frame comprises beams 1 and 2 spaced apart the required distance and rigidly secured together by braces 3 and 4 bolted to each beam; on the rear of each beam is a plow body $a$. The forward ends of the beams 1 and 2 converge and are bolted to a plate 5 which is inserted between the ends of the beams. A crank axle 6 is loosely journaled in a bearing 7 secured on the beam 2, and also in a bearing 8 mounted on a lever 9 and intermediate the ends thereof; the lever 9 is pivotally supported on a radius arm of a sector 10 on the beam 1, the arc of the sector having notches with which a latch of the usual type, on the lever 9, is adapted to engage. A furrow wheel 11 is carried on the furrowward crank arm of the axle 6, and a landwheel 12 is carried on the landward crank arm of the axle 6; preferably I employ the traction power of the landwheel 12 to raise the plow utilizing the mechanism shown, described and claimed in Letters Patent No. 1,489,481, granted to me April 8, 1924, which includes a clutch adapted to be operated at will to transmit the traction power of the landwheel 12 to a sun gear 13 in mesh with a planet gear 14, the latter being preferably integral with a casing 15 forming part of the clutch by the operation of which power is transmitted from the wheel 12. The planet gear does not rotate and is rigid on a stub shaft 16 journaled in a sleeve 17 at one end of an arm 18, the opposite end of the latter having a sleeve 19 loosely supported on the end of the crank axle. A link 20 is secured to the stub shaft 16 and extends to a lever 21 to which it is pivotally connected; the lever 21 is pivotally supported on the plow frame and is operable to regulate the depth of plowing, a latch on the lever 21 engages with any one of a series of notches in a sector 22 mounted on the beam 2. The parts of the clutch are normally separated but are moved into connection to raise the plow, or disconnect to lower the plow by operation of a tripping device optionally actuated from the tractor, as explained in said Letters Patent.

Pivotally mounted on the plate 5 is a bell crank or three armed lever made of two similarly shaped parts 24 and 25 secured together. The intermediate arm of said lever is connected with the front end portion of the beam by a pivot 26 from which point an arm 23 extends upwardly and rearwardly and has a rod 27 hooked to its upper end. The rod 27 extends rearward to connection with an arm 28 rigidly secured on the axle 6 between the beams 1 and 2. The parts 24 and 25 of the bell crank lever are respectively pivoted on opposite sides of the plate 5 and from the pivot 26 arms 23$^a$ extend forwardly at an angle to the arm 23 and are then bent downwardly intermediate their lengths; links 29 and 30 are pivotally connected to the forwardly extending arms 23$^a$ of the bell crank lever and extend downwardly. Part of a draw bar 31 is shown and is adapted to be connected to a tractor in any desired manner. The plow is secured to the drawbar 31 by a vertically and laterally swinging draft connection comprising a bolt 32 inserted through perforations in a coupling 33 and the drawbar 31, the rear end of the coupling having a vertical slot in which are pivotally secured, by a bolt 34, the converged ends of links 35 and 36 which extend rearwardly on opposite sides of the plate 5 and are pivotally connected by vertical links 29, 30, to the forward ends of the arms 23$^a$ of the bell crank lever. Between the rear ends of the links 35 and 36 is an anti-friction roller 38 journaled on the bolt 37 which connects said links with the links 29, 30, which roller operates in a vertical slot 39 in the forward part of the plate 5 which is extended downwardly below its connection to the beams 1 and 2. Through the roller 38 the draft is transmitted directly to the forward end of the plow beam, and vertical movement of the beam relatively to the draft connections is permitted under the control of the bell crank lever.

The depth at which the plow is to operate is regulated as desired by actuation of the lever 21 to rotate the axle 6 and thereby raise or lower the plow for that purpose, as fully described in the Letters Patent above referred to. Since the arm 28 is rigidly mounted on the axle 6, whenever said axle is rocked, either by actuation of the depth adjusting lever 21, or by the functioning of the power lift mechanism, said arm is rocked forward or backward, accordingly as the plow is raised or lowered, and as said arm is connected to the bell-crank lever by the rod 27 said lever is simultaneously rocked on its pivot on the plate 5, thereby effecting a relative vertical movement between the roller 38 and the front end of the beam. It will be evident, therefore, that the bell-crank and the rod 27 that connects it with the axle arm 28 constitute controlling means that acts coincidently with the raising and lowering of the plow to shift the point of application of the draft to the beam as it rises or descends, and to hold the draft connection at a substantially constant distance from the ground, or in the line of draft, when the plow is in its different working positions. From an inspection of the drawing it will be evident that when the axle 6 is rotated to raise the plow the draft connection remains substantially stationary, vertically, but the point of application of the draft to the front end of the beam is moved downwardly relatively to the plow owing to the forward rocking movement of the arm 28 and the bell-crank lever, whereas in lowering the plow the action is reversed. By this connection of the draft device with the axle the former is automatically controlled and its position with relation to the ground is maintained substantially constant notwithstanding the raising or lowering of the plow for the purpose of adjustment of the plowing depth. The slot 39 is made long enough to permit the vertical movement of the front end of the beam that occurs in connection with the adjustment of the plow bodies to vary the depth of plowing without affecting the vertical position of the roller 38. Consequently, in all operating positions of the plow bodies, the draft connections remain in the line of draft. When the draft adjusting lever has been set for plowing at a given depth, the operative setting of the draft devices with relation to the plow beam is not disturbed by the lifting of the plow bodies out of operative position and, consequently, when they are lowered again into operative position no readjustment of the position of the draft devices is required. It will be noted that adjustment of the depth regulating lever coincidently varies the range of vertical movement of the front end of the beam relatively to the point of application of the draft thereto resulting from the lifting and lowering of the plow bodies by power, which makes practicable the actuation of the devices for holding the draft connections in constant relation to the ground by the rocking of the axle by which also the plow bodies are lifted out of operative position.

What I claim is—

1. In a wheeled plow the combination with a beam, a plow body thereon, and a wheel supported crank axle on which said beam is carried, of depth adjusting means for rocking said axle to vary the depth of plowing, draft connections having relative vertical movement with respect to the beam for applying draft power to the front end portion of the beam, an arm rigidly mounted on the axle to rock therewith, and means actuated by said arm for holding said draft connections substantially stationary vertically when said axle is being rocked by said depth adjusting means.

2. In a wheeled plow the combination with a beam, a plow body thereon, and a wheel supported crank axle on which said beam is carried, of depth adjusting means for rocking said axle to vary the depth of plowing, draft connections having relative vertical movement with respect to the beam for applying draft power to the front end portion of the beam, an arm rigidly mounted on the axle to rock therewith, and means mounted on the beam and actuated by said arm for holding said draft connections substantially stationary vertically when said axle is being rocked by said depth adjusting means.

3. In a wheeled plow the combination with a beam, a plow body thereon, a wheel supported crank axle on which said beam is carried, optionally controlled power actuated means for rocking said axle to lift the plow body above the ground, and depth adjusting means for rocking said axle to vary the depth of plowing, of draft connections having relative vertical movement with respect to the beam for applying draft power to the front end portion of the beam, an arm rigidly mounted on the axle to rock therewith, and means actuated by said arm for holding said draft connections substantially stationary vertically when said depth adjusting means is actuated to vary the depth of plowing.

4. In a wheeled plow the combination with a beam, a plow body thereon, a wheel supported crank axle on which said beam is carried, and optionally controlled power actuated means for rocking said axle to lift the plow body above the ground, of a draft connection connected with, and having relative vertical movement with respect to the front end portion of the beam, for applying draft power thereto, means actuated by the rocking of said axle to raise or lower the front end portion of the beam relatively to the point of application of the draft thereto, and means for adjusting the beam vertically to vary the depth of plowing and for coincidently varrying the range of vertical movement of the front of the beam relatively to the point of application of the draft thereto.

5. In a plow the combination with a beam, a furrow opener carried thereby, a ground engaging wheel, a crank axle supporting the beam on said wheel and adapted to be rocked to vary the depth of plowing, and optionally controlled power operated means for rocking said axle, of a lever operating in a vertical plane and pivotally connected with the front end portion of the beam, a draft connection pivotally connected with a propelling member and with an arm of said lever, and means connecting another arm of said lever with said axle, whereby the rocking of said axle will rock said lever to adjust the front of the beam vertically relatively to said draft connection.

6. In a plow the combination with a beam, a furrow opener carried thereby, a ground engaging wheel, a crank axle supporting the beam on said wheel and adapted to be rocked to vary the depth of plowing, and optionally controlled power operated means for rocking said axle, of a lever operating in a vertical plane and pivotally connected with the front end portion of the beam, a draft connection pivotally connected with a propelling member and with an arm of said lever, means connecting another arm of said lever with said axle, whereby the rocking of said axle will rock said lever to adjust the front of the beam vertically relatively to said draft connection, and manually operable means for rocking said axle to vary the depth of plowing.

7. In a wheeled plow, the combination with a crank axle and supporting wheels, of means to rock said axle to adjust the plow for varying depths of plowing, draft connections including a plate having a vertical slot, a bell crank pivotally mounted on said plate, links depending from an arm of the bell crank and having a roller supported between their lower ends and within said slot, a draft coupling, a draft link connection between said roller and coupling, an arm rigid on the axle, and a rod connecting said arm and bell crank whereby rocking of the axle to vary the depth of plowing will simultaneously rock said bell crank to hold the point of connection of the draft connections with the plow substantially in the line of draft irrespective of the operative position of the plow.

8. In a wheeled plow, the combination with a beam, a plow body thereon, a wheel supported crank axle on which said beam is carried, and a draft connection for applying draft power to the front end portion of the beam, movable vertically relatively thereto, of controlling means mounted on the beam and connected with said draft connection and with the axle, and actuated by the rocking of the axle to move the beam vertically relatively to said draft connection, a lever operable to rock said axle to vary the depth of plowing, means for locking said lever to hold the draft connection substantially in the line of draft when the plow is at work, and power operated means for rocking said axle to raise the plow above the ground to inoperative position and to lower it to operative position, said controlling means acting coincidently with such raising and lowering, respectively, of the plow to shift the point of application of the draft to the beam away from, and to restore it to the operating position for which it is set.

9. In a wheeled plow, the combination with a beam, a plow body thereon, a wheel supported crank axle on which said beam is carried, and optionally controlled power actuated means for rocking said axle through a predetermined arc to lift the plow body above the ground, of a draft connection connected with, and having relative vertical movement with respect to, the front end portion of the beam, for applying draft power thereto, means actuated by the rocking of said axle to raise or lower the front end portion of the beam relatively to the point of application of the draft thereto, and means for adjusting the position of the beam relatively to said axle to vary the depth of plowing.

10. In a wheeled plow, the combination with a beam, a plow body thereon, a wheel supported crank axle on which said beam is carried, and a draft connection connected with, and having relative vertical movement with respect to, the front end portion of the beam, for applying draft power thereto, of means actuated by the rocking of said axle to move the front end portion of the beam vertically with respect to said draft connection, means operable to adjust the axle angularly relatively to the beam to vary the depth of plowing and coincidently vary vertically the point of application of the draft to the front end portion of the beam, and power actuated means for rocking said axle to lift the plow body above the ground independently of actuation of said depth adjusting means.

11. In a wheeled plow the combination with a beam, a plow body thereon, and a wheel supported crank axle on which said beam is carried, of depth adjusting means for rocking said axle to vary the depth of plowing, a draft connection adapted to transmit the draft of a propelling member to the front end portion of the beam, said draft connection having relative vertical movement with respect to the beam, and being adapted to swing vertically and laterally with respect to such propelling member, an arm rigidly mounted on the axle to rock therewith, and means actuated by said arm for holding said draft connection substantially stationary vertically when said axle is being rocked by said depth adjusting means.

12. In a wheeled plow the combination with a beam, a plow body thereon, and a wheel supported crank axle on which said beam is carried, of depth adjusting means for rocking said axle to vary the depth of plowing, a draft connection adapted to transmit the draft of a propelling member to the front end portion of the beam, said draft connection having relative vertical movement with respect to the beam, and being adapted to swing vertically and laterally with respect to such propelling member, an arm rigidly mounted on the axle to rock therewith, and means mounted on the beam and actuated by said arm for holding said draft connection substantially stationary vertically when said axle is being rocked by said depth adjusting means.

13. In a wheeled plow, the combination with a beam, a furrow opener carried thereby, a wheel supported crank axle upon which said beam is carried, and depth adjusting means for rocking said axle to vary the depth of plowing, of means for transmitting the draft of a propelling member to the plow comprising a draft connection between the propelling member and the beam, adapted to swing vertically and laterally with respect to the propelling member, and movable vertically relatively to the beam, a vertically disposed slot at the forward end portion of the beam, and means carried by said draft connection and operating in said slot to transmit the draft to said beam, an arm rigidly mounted on the axle to rock therewith, and means actuated by said arm for holding said draft connection substantially stationary vertically when said axle is being rocked by said depth adjusting means.

14. In a wheeled plow, the combination with a beam, a furrow opener carried thereby, a wheel supported crank axle upon which said beam is carried, and depth adjusting means for rocking said axle to vary the depth of plowing, of means for transmitting the draft of a propelling member to the plow comprising a draft connection between the propelling member and the beam adapted to swing vertically and laterally with respect to the propelling member, and movable vertically relatively to the beam, a vertically disposed slot at the forward end portion of the beam, and means carried by said draft connection and operating in said slot to transmit the draft to said beam, an arm rigidly mounted on the axle to rock therewith, and a bell-crank lever mounted on the beam and connected with said arm and with said draft connection for moving said beam vertically relatively to the draft connection when said depth adjusting means is actuated to vary the depth of plowing.

15. In a wheeled plow, the combination with a beam, a plow body thereon, and a wheel supported crank axle on which said beam is carried, of means operable to rock said axle, draft connections having relative vertical movement with respect to the beam for applying draft power to the front end portion of the beam, an arm rigidly mounted on the axle to rock therewith, and means connected with said draft connections and actuated by said arm for holding said draft connections substantially stationary vertically when said axle is rocked.

16. In a wheeled plow, the combination with a beam, a plow body thereon, and a wheel supported crank axle on which said beam is carried, of devices operable to rock said axle, a draft device having a vertically shiftable connection with the front end portion of the beam, a bell-crank lever supported by the beam and connected with said draft device, and a connection between the axle and said bell-crank lever operating to rock the latter when the axle is rocked.

17. In a wheeled plow, the combination with a beam, a plow body thereon, and a wheel supported crank axle on which said beam is carried, of means for rocking said axle, a bell-crank lever supported by the beam, an arm rigid on the axle and connected with one of the arms of said bell-crank lever, and a draft device having a vertically shiftable connection with the front end portion of the beam, said draft device being connected with the other arm of said bell-crank lever.

18. In a wheeled plow, the combination with a beam having a vertically disposed slot at its forward end, a plow body on said beam, and a wheel supported crank axle on which said beam is carried, of means for rocking said axle, a draft device engaging the slot in said beam for applying draft power thereto, an arm rigidly mounted on the axle to rock therewith, and means connected with said arm and with said draft device for holding the latter substantially stationary vertically when said axle is rocked.

19. In a wheeled plow, the combination with a beam having a vertically disposed slot at its forward end, a plow body on said beam, and a wheel supported crank axle on which said beam is carried, of means for rocking said axle, a draft device engaging the slot in said beam for applying draft power thereto, an arm rigidly mounted on the axle to rock therewith, and a bell-crank lever supported by the beam and connected with said arm and with said draft device.

THEOPHILUS BROWN.